(12) United States Patent
Brown et al.

(10) Patent No.: US 6,433,098 B1
(45) Date of Patent: *Aug. 13, 2002

(54) PROCESS OF PREPARING CURABLE COMPOSITIONS AND COMPOSITIONS THEREFROM

(75) Inventors: Ward Thomas Brown, North Wales; Michael Damian Bowe, Newtown; Richard Foster Merritt, Fort Washington; Ronald Scott Beckley, Gilbertsville; Barry Clifford Lange, Lansdale; Robert Wilczynski, Yardley, all of PA (US)

(73) Assignee: Rohm and Haas Company, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,425

(22) Filed: Apr. 13, 1999

Related U.S. Application Data

(63) Continuation-in-part of application No. 09/212,038, filed on Dec. 15, 1998, and a continuation-in-part of application No. 09/034,294, filed on Mar. 5, 1998, now abandoned, which is a continuation of application No. 08/467,685, filed on Jun. 5, 1995, now abandoned, which is a division of application No. 08/258,300, filed on Jun. 13, 1994, now abandoned, and a continuation-in-part of application No. 09/047,547, filed on Mar. 25, 1998.
(60) Provisional application No. 60/077,059, filed on Mar. 6, 1998, and provisional application No. 60/042,725, filed on Apr. 8, 1997.

(51) Int. Cl.$^7$ ............................. C08F 8/00; C08C 19/00
(52) U.S. Cl. ...................... 525/274; 525/286; 525/292; 525/301; 525/303; 525/309; 525/310; 525/326.5; 525/327.3; 525/327.5; 525/327.7; 525/328.8; 525/328.9; 525/329.4; 525/329.5; 525/330.1; 525/330.2; 525/330.6; 525/330.7; 525/333.1; 525/333.2; 525/333.3; 525/333.5
(58) Field of Search ............................. 525/301, 330.1, 525/330.2, 303, 309, 310, 274, 292, 286, 326.5, 327.3, 327.5, 327.7, 328.8, 328.9, 329.4, 329.5, 330.6, 330.7, 333.1, 333.2, 333.3, 333.5

(56) References Cited

U.S. PATENT DOCUMENTS

| | | | |
|---|---|---|---|
| 4,158,736 A | 6/1979 | Lewis et al. | 560/205 |
| 4,356,288 A | 10/1982 | Lewis et al. | 525/308 |
| 4,529,787 A | 7/1985 | Schmidt et al. | 526/320 |
| 4,680,352 A | 7/1987 | Janowicz et al. | 526/147 |
| 4,694,054 A | 9/1987 | Janowicz et al. | 526/93 |
| 5,484,850 A | * 1/1996 | Kempter et al. | 525/301 |
| 5,576,386 A | 11/1996 | Kempter et al. | 526/88 |
| 5,710,227 A | 1/1998 | Freeman et al. | 526/208 |
| 5,710,277 A | 1/1998 | Freeman et al. | 526/208 |

FOREIGN PATENT DOCUMENTS

| | | |
|---|---|---|
| DE | 4419 568 A1 | 6/1994 |
| EP | 0 240 439 A1 | 3/1987 |
| EP | 0 650 978 A1 | 10/1994 |
| EP | 0 796 873 A1 | 10/1996 |
| WO | WO 98/47927 | 10/1998 |

OTHER PUBLICATIONS

Chemical Engineering, "Supercritical Fluid Conditions", edited by M. Paulaitis, J. M. L. Penninger, R. D. Gray, Jr. and P. Davidson, pp. 515–533. 1983.

European Polymer Journal, 1972, vol. 8, pp. 321–328, "Base–Catalysed Oligomerization of Vinyl Monomer—III", B. A. Feit.

Chemical Engineering News, "Regulation of Biotechnology Progresses", Jan. 7, 1985 pp. 27–28.

* cited by examiner

Primary Examiner—D. R. Wilson

(57) ABSTRACT

The invention relates to a curable composition and a process of preparing the curable composition. The process comprises (a) forming an oligomer from oligomerization of a mixture of a monomer A having a functional group and a monomer B at a temperature in the range of from 150° C. to 650° C., a pressure in the range of from 3 MPa to 35 MPa and the pressure is high enough to maintain the reaction mixture in a fluid state and a residence time in the range of from 0.1 second to 4 minutes; and (b) reacting a modifier having at least one reactive moiety with the oligomer through a reaction between the reactive moiety of the modifier and the functional group of the monomer A in the oligomer, and the modifier further comprises a curable group.

10 Claims, No Drawings

PROCESS OF PREPARING CURABLE COMPOSITIONS AND COMPOSITIONS THEREFROM

This application is a continuation-in-part of U S. application Ser. No. 09/212,038, filed Dec. 15, 1998, a non-provisional application which:

has priority from provisional U.S. application Ser. No. 60/077,059, filed Mar. 6, 1998;

is a continuation-in-part of U.S. application Ser. No. 09/034,924, filed Mar. 5, 1998, and now abandoned, which is a continuation of U.S. applcation Ser. No. 08/467,685, filed Jun. 5, 1995, and now abandoned, which is a divisional of U.S. application Ser. No. 08/258,300, filed Jun. 13, 1994, and now abandoned; and is a continuation-in-part of U.S. application Ser. No. 09/047,547, filed Mar. 25, 1998, a non-provisional application having priority from provisional U.S. application Ser. No. 60/042,725, filed Apr. 8, 1997.

The present invention relates to a process of preparing curable compositions and compositions therefrom.

Oligomers, polymers with low Dp (degree of polymerization), of acrylate or methacrylate unit-containing backbones are of commercial interest and have industrial uses for many different applications, such as adhesives, inks, coatings, films, and others. A suitable low Dp value will provide a material with a molecular weight high enough for reduced toxicity, yet low enough for low viscosity. However, production of such oligomers has proven to be difficult and is frequently carried out by cumbersome and/or not very selective processes. It becomes even more difficult if a crosslinkable or curable oligomer composition is desired for the applications. This is because crosslinking or curing property typically requires the presence of additional reactive pendant groups in the oligomers. Such reactive pendant groups may be partially or substantially eliminated or reacted away by unintended side reactions or premature crosslinking reactions during the oligomerization reaction.

Several approaches have been tried and used to effect production of such oligomers. For example, one approach uses chain transfer agents to control Dp. As a result of the chain transfer chemistry involved, one chain transfer agent is incorporated into each backbone structure of the oligomers. This makes the oligomer property much less uniform and harder to control. In addition, the most commonly used chain transfer agents are mercaptans. Due to their odors and chemical properties, it becomes increasingly more difficult socially and less acceptable environmentally to use such sulfur-based materials. Other common chain transfer agents such as hypophosphites, bisulfites and alcohols would also impart additional functionalities into the oligomers. Such additional functionalities may not be compatible with other ingredients in a formulated product or suitable for the intended applications. Removal of the additional functionality from the resultant oligomers may be difficult and/or expensive.

Another approach calls for the use of large amounts of initiators or catalysts. This approach adds raw material cost to oligomer production. It also may result in undesirable oligomer chain degradations, branching, and unintended or premature crosslinking of the product prior to use. In addition, any residual initiators or catalysts in the product may have to be removed before the product can be used for many applications to avoid compatibility or contamination problems.

U.S. Pat. No. 4,356,288, discloses the preparation of terminally-unsaturated oligomers with a Dp in the range of from about 6 to about 30 from esters of acrylic acid by an anionic polymerization reaction carried out in the presence of a catalytic amount of an alkoxide anion. Alkoxide anions are known to be sensitive to water. Accordingly, the method is often adversely affected by the presence of moisture, resulting in lower yield and/or lower uniformity of the oligomer product.

Another patent, U.S. Pat. No. 5,710,227, discloses a high temperature, continuous polymerization process for preparing terminally unsaturated oligomers which are formed from acrylic acid and its salts, and acrylic acid and its salts with other ethylenically unsaturated monomers. The high temperature, continuous polymerization process solves many of the problems associated with previously known methods for preparing terminally-unsaturated oligomers formed from acrylic acid. However, the neat form of many of the acrylic acid products are solid at room temperature and, thus, requiring either heating and/or the addition of a solvent to handle and use the products.

U.S. Pat. No. 5,484,850 discloses copolymer compositions which are crosslinkable by a free radical method and have a Mn from 1500 to 6000 and a polydispersity of 1 to 4. Copolymer A is composed of from 50 to 85 mol % of a monomer (a1) containing methacryloyl group; from 15 mol % to 50 mol % of another monomer (a2) capable of undergoing free-radical polymerization; and from 5 mol % to 50 mol % of the total amount of the monomers (a1) and (a2) being monomers (a3) which carry functional groups selected from the group consisting of hydroxy, carboxyamido, amino, carbonyl, isocyanate, carboxyl and epoxy, the functional groups being capable of undergoing a condensation or addition reaction. The polymerization is carried out at a temperature from 140 to 210° C. and with an average residence time of from 2 minutes to 90 minutes. Copolymer A reacts with an olefinically unsaturated monomer B which carries a functional group which is complementary to the functional groups of monomers (a3). The products are solids which tend to limit their uses and processing options.

The present invention seeks to overcome the problems associated with the previously disclosed methods for preparing oligomers, particularly curable or crosslinkable liquid oligomers, by providing an oligomerization process that produces curable oligomers with a low Dp, in the range of from 3 to 100, without the need of excessive amounts of initiators. The curable oligomer products are in liquid form and may be terminally unsaturated. The crosslinkable or curable functionality is incorporated into the oligomer by a reaction after the oligomerization—a post-oligomerization reaction—between the oligomer or altered oligomer with a modifier which contains a crosslinkable/curable functional group. The present invention also provides curable oligomer compositions prepared according to the disclosed process. Furthermore, the invention provides curable oligomer compositions which are substantially free of metals, salts and/or surfactant contaminants. The product from the present invention is useful for a number of applications, such as films, markings, coatings, paints, adhesives, binders, inks and others.

More specifically, the present invention relates to a process of preparing a curable composition comprising forming an oligomer having a Dp in the range of from 3 to 100 from oligomerization of a mixture which comprises a monomer A and a monomer B under a first condition, wherein the monomer A has at least one functional group which either is generated after the oligomerization or is present in the monomer A before the oligomerization and remains substantially unreacted during the oligomerization; the oligomer has a first number of monomer units incorporated into its backbone; and wherein the first condition comprises a temperature in the range of from 150° C. to 650° C. and a pressure in the range of from 3 MPa to 35 MPa which is sufficient to maintain the mixture in a fluid state, and a residence time at the temperature and the pressure in the range of from 0.1 second to 4 minutes; and reacting a modifier having at least one reactive moiety with the oligomer through a reaction under a second condition between the reactive moiety of the modifier and the functional group of the monomer A incorporated into the oligomer to produce the curable composition, wherein the modifier further comprises a curable group selected from the group consisting of a carbon-carbon double bond, an oxygen-containing heterocyclic group and mixtures thereof, and the curable group remains pendant in the curable composition and crosslinkable after the reaction.

The term "oligomer" used herein means a polymer composition which has a degree of polymerization (Dp) in the range of from 3 to 100. Unless otherwise specified in the present application, the term "polymerization" is used herein as a generic term and interchangeably with the term "oligomerization." An oligomer has a number of monomer units incorporated into the backbone. Dp is determined as a monomer unit average number. Depending on the oligomerization reaction mechanism, the actual number of carbon atoms in a particular oligomer backbone may be of an even or an odd number, even though the carbon-carbon double bonds in the monomers have two carbons each. Since it is rare that all of the oligomer molecules have the same total number of monomer units incorporated into the backbone, there is usually a distribution of various oligomers with either smaller and/or larger Dp than the range indicated and/or preferred in the application. This type of distribution is also known to exist in almost all polymers and it is commonly referred to as "polydispersity." A preferred Dp for this invention is in the range of from 5 to 50. A more preferred Dp is in the range of from 5 to 20.

The present invention also relates to a curable composition, particularly by UV, visible light, electron beam methods, prepared by a process comprising forming an oligomer with a Dp in the range of from 3 to 100 from oligomerization of a mixture which comprises a monomer A and a monomer B under a first condition, wherein the monomer A has at least one functional group which either is generated after the oligomerization or is present in the monomer A before the oligomerization and remains substantially unreacted during the oligomerization; wherein the monomer B is selected from the group consisting of ethylene, propylene, $C_4$ to $C_{10}$ α-olefins, butadiene, isoprene, styrene, substituted styrene, vinyl ester, vinyl ether, vinyl silane, vinyl halide, acrylic acid, methacrylic acid, crotonic acid, alkyl acrylate ester, alkyl methacrylate ester, alkyl crotonate ester, acrylamide, methacrylamide, N-substituted acrylamide, N-substituted methacrylamide and mixtures thereof; the oligomer has a first number of monomer units incorporated into its backbone; and wherein the first condition comprises a temperature in the range of from 150° C. to 650° C. and a pressure in the range of from 3 MPa to 35 MPa which is sufficient to maintain the mixture in a fluid state, and a residence time at the temperature and the pressure in the range of from 0.1 second to 4 minutes; and reacting a modifier having at least one reactive moiety with the oligomer through a reaction under a second condition between the reactive moiety of the modifier and the functional group of the monomer A incorporated into the oligomer to produce the curable composition, wherein the modifier further comprises a curable group selected from the group consisting of a carbon-carbon double bond, an oxygen-containing heterocyclic group and mixtures thereof, and the curable group remains pendant in the curable composition and crosslinkable after the reaction.

The word "pendant" means that a group, a functional group or a reactive moiety, is not in the backbone structure itself of an oligomer or polymer. A reaction of a pendant group for the present invention will not cause any changes of the backbone structure itself. A pendant group, may be attached directly to a carbon in the backbone structure of the oligomer. Examples of this directly-attached type pendant groups include —OH or —OC(=O)(CH$_3$) group (from vinyl acetate monomer); and —COOH or —COO(R) group (from acrylates or methacrylates). Or, there may be other intermediate chemical moieties or groups between the functional group and the carbon atom in the backbone structure to server as "linkers." An example of this type is the —OH group in 2-hydroxyethyl methacrylate when it is used as one of the monomers. There is a —CH$_2$CH$_2$— group between the —OH group and the —C(=O)—O— group of the backbone structure. Other linker examples include -(O—CH$_2$CH$_2$-)$_n$ where n is in the range of 1 to 10. Others become clear from the rest of the description of the present invention. Pendant groups for this invention are generally reactive, either they are suitable for attaching a crosslinkable or curable group to the oligomers, or they are used for curing or crosslinking. Curing and crosslinking are used herein interchangeably.

To facilitate understanding of the present invention, a general scheme is summarized below. It is used for illustration purposes only, not intended for limiting the scope of invention which is defined herein by the specification and the claims. It is also understood that some of the steps may be carried out simultaneously or sequentially.

monomer A+monomer B→oligomer [→post-oligomerization generation of functional groups, optional] →reaction with a modifier to form a curable composition [→emulsion formation to form a curable formulation, optional]→curing or crosslinking.

In the instant invention, an oligomer is prepared by an oligomerization reaction of a mixture which comprises a monomer A and a monomer B. The mixture may further comprise a solvent and other materials for a variety of purposes such as catalysis or reaction mediation. The monomer A and the monomer B preferably are different, but they may be the same in certain specific cases wherein the monomer A is produced by transforming the monomer B incorporated in an oligomer after the oligomerization reaction, as described below in more detail. The monomer A and the monomer B may be premixed, with or without a solvent, prior to the oligomerization, or they may be introduced separately into a reaction zone at a predetermined rate or manner. The latter typically requires a mechanism to provide proper mixing. The mechanism can be static such as specially designed inlets, nozzles, or mobile such as a mechanical stirring device. For the present invention, it is preferred to have the monomers and optionally a solvent, if present, premixed before they are fed into the reactor.

For the present invention, the monomer A must have, in addition to a polymerizable or oligomerizable carbon-carbon double bond, a functional group which does not participate in, or remains pendant or substantially unreacted during the oligomerization reaction. Such a functional group may be already present in the monomer A itself prior to the oligomerization or it may be generated after the oligomerization from a "monomer A equivalent." After the functional group is generated, the reaction between the modifier through its reactive moiety and the functional group of the oligomer can be carried out to form the curable composition.

It is within the scope of the present invention to generate the functional group post-oligomerization from a "monomer A equivalent", i.e. after the oligomerization is completed or substantially completed. This requires the use of a "monomer A equivalent" in the oligomerization reaction and at least one additional conversion reaction to generate the desired functional group. It is also possible to have the additional conversion reaction and the oligomerization occur almost simultaneously.

A "monomer A equivalent" is an oligomerizable or polymerizable monomeric carbon-carbon-double-bond-containing compound which has another group that may be converted to produce the desired functional group after the oligomerization or polymerization is completed or substantially completed during the oligomerization reaction. A "monomer A equivalent" may be the same as the monomer B used in the oligomerization reaction.

There may be various reasons and benefits for using a "monomer A equivalent." For example, vinyl alcohol does not have a chemically stable monomeric form which can be easily used in an oligomerization or polymerization reaction. Accordingly, vinyl acetate is used most frequently as vinyl alcohol's "equivalent" and the acetate group is converted by hydrolysis to generate the desired hydroxy (OH) group after the oligomerization or polymerization reaction is completed. If desired, the acetate group can also be converted into an acrylate or methacrylate group via a trans-esterification reaction or by hydrolysis followed by direct esterification.

Following is another example of this type of post-oligomerization generation of functional groups, particular pendant functional groups, where the "monomer A equivalent" is the same as the monomer B. For instance, a homo-oligomer of methyl acrylate may be partially or completely hydrolyzed to form carboxylic acid groups, i.e. —COOMe groups are transformed into —COOH functional groups via hydrolysis. Such functional groups then can be reacted with a modifier having a reactive moiety such as glycidyl (meth)acrylate or hydroxyalkyl ester of acrylic or methacrylic acid to achieve the desired incorporation of crosslinkable or curable carbon-carbon double bonds. Another example involves a co-oligomer prepared from different esters of ethylenically unsaturated acids. A typical co-oligomer may be made from methyl acrylate and n-butyl methacrylate. A post-oligomerization hydrolysis reaction will also produce —COOH groups. One advantage of such a post-oligomerization generation of functional groups is that the hydrolysis reaction can be controlled or adjusted to give the desired level or amount of functional groups in the oligomer products. Because different monomer units in the oligomer structure usually have different hydrolysis or trans-esterification rates, this method provides another way of controlling the incorporation of crosslinkable functionalities. Another type of post-oligomerization generation of functional groups involves hydrolysis of pendant amide groups.

Many compounds are suitable for use as the monomer A in the present invention. The selection depends primarily on the monomer B used and the reactive moiety on the selected modifier. The monomer A must have at least one functional group that exists after or does not substantially participate in the oligomerization reaction. General categories of such functional groups include carbon-carbon double bond, halide, hydroxyalkyl, hydroxyaryl, carboxylic acid or ester, epoxy (or oxiranyl), oxetanyl, anhydride, alkylsiloxy, alkoxysilyl, and arylsiloxy groups. Groups like anhydride could be in a form incorporated through the carbon-carbon double bond of monomers like maleic anhydride, citraconic anhydride, and itaconic anhydride. It is understood that not all the disclosed functional groups can be used for all the different types of oligomerization reactions. It is also understood that not all the functional groups will react with all the reactive moieties of all modifiers. For the present invention, there must be a reasonable reaction rate between the functional group and the reactive moiety under a second reaction condition, with or without a catalyst or reaction mediator. Chemical compatibility must also be satisfied. Specific limitations on functional groups and reactive moieties are further disclosed herein.

Examples of a monomer A suitable for the present invention include: acrylic acid, methacrylic acid, 1,3-butadiene, isoprene, 4-vinylcyclohexene, allyl alcohol, allyl esters such as allyl acetate, allyl propionate, allyl acrylate, allyl methacrylate, allyl crotonate, vinyl acrylate, vinyl methacrylate, vinyl crotonate, vinyl chloride, vinyl bromide, vinylidene chloride, vinylidene fluoride, vinyl acetate, vinyl benzoate, norbornadiene, substituted norbornadienes, 4-vinylcyclohexene oxide, glycidyl methacrylate, glycidyl acrylate, glycidyl crotonate, 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, acrolein, methacrolein, maleic anhydride, itaconic anhydride, citraconic anhydride, vinyltrimethoxysilane, vinyltriethoxysilane, vinyltrichlorosilane, allyltrichlorosilane, allyltrimethoxysilane, allyltriethoxysilane, γ-methacryloxypropyltrimethoxysilane, and mixtures thereof.

Examples of a "monomer A equivalent" include vinyl acetate, vinyl halide (such as vinyl chloride, vinyl bromide, vinyl iodide, vinyl fluoride), vinylidene halide, allyl acetate, allyl propionate, methacrylonitrile, acrylonitrile, $C_1$–$C_{20}$ alkyl acrylate esters, $C_1$–$C_{20}$ alkyl methacrylate esters, $C_1$–$C_{20}$ alkyl crotonate esters, acrylamide and N-substituted acrylamides such as N-methylacrylamide, methacrylamide and N-substituted methacrylamides such as N,N-dimethylmethacrylamide, and mixtures thereof The corresponding functional groups generated are —OH (vinyl acetate and allyl acetate) and —COOH (others) respectively. Depending on the desired products, certain monomer A such as maleic anhydride, itaconic anhydride and citraconic anhydride also could serve as a "monomer A equivalent" to produce dicarboxylic acid functional groups.

The monomer B is typically an ethylenically unsaturated monomer and its derivatives thereof, such as olefins, styrenes, unsaturated carboxylic acids, esters and amides, vinyl esters, vinyl ethers, vinyl silanes, and mixtures thereof. A preferred monomer B comprises α,β-ethylenically unsaturated carboxylic acids, preferably acrylic acid and methacrylic acid, and their esters of linear or branched alcohols containing from 1 to 20 carbons. Specific examples of monomer B include, but are not necessarily limited to, ethylene, propylene, $C_4$–$C_{10}$ α-olefins, 1,3-butadiene, isoprene, styrene, substituted styrenes such as p-methylstyrene, vinyl acetate, vinyl benzoate, vinyl chloride, vinyl bromide, allyl acetate, methyl acrylate, methyl methacrylate, methyl crotonate, ethyl acrylate, ethyl methacrylate, ethyl crotonate, n-propyl acrylate, n-propyl methacrylate, n-propyl crotonate, i-propyl acrylate, i-propyl methacrylate, i-propyl crotonate, n-butyl acrylate, n-butyl methacrylate, n-butyl crotonate, sec-butyl acrylate, sec-butyl methacrylate, sec-butyl crotonate, ethyl 4,4,4-trifluorocrotonate, 2-ethylhexyl acrylate, 2-ethylhexyl methacrylate, 2-ethylhexyl crotonate, acrylic acid, methacrylic acid, crotonic acid, acrylamide, methacrylamide, N,N-dimethylacrylamide, N,N-diethylacrylamide, N,N-dimethylmethacrylamide, N,N-diethylmethacrylamide, ethyl vinyl ether, n-propyl vinyl ether, n-butyl vinyl ether, isobutyl vinyl ether, 2-ethylhexylvinyl vinyl ether, 2-chloroethyl vinyl ether, 2-aminoisobutyl vinyl ether, vinyltrimethylsiane and mixtures thereof.

Where the desired functional groups are already present in the monomer A and remain substantially unreacted or pendant during and after the oligomerization, the molar ratio of the monomer A to monomer B incorporated into the backbone of the oligomer produced is in the range of from 1:40 to 40:1, preferably in the range of from 1:20 to 20:1, most preferably in the range of from 1:5 to 5:1.

Where the functional groups are generated post-oligomerization from the "monomer A equivalent" incorporated into the oligomers, the ratio of the number of generated functional groups to the number of total monomer units in the oligomer backbone is in the range of from 1:100 to 1:1. It is also within the scope of the present invention if the "monomer A equivalent" can be converted into more than one functional group, say z number of groups, per monomer unit, the ratio could exceed 1:1 to as high as z:1. For example, if a monomer has a maleic anhydride group which can be converted into two carboxylic functional group per monomer unit. The ratio could exceed 1:1 to 1.5:1 or to a maximum of 2:1.

The oligomerization reaction is carried out under a first condition which comprises a temperature of at least 150° C., generally in the range from 150° C. to 650° C., preferably in the range of from 200° C. to 500° C., more preferably from 275° C. to 450° C. and a pressure in the range of from 3 MPa to 35 MPa, preferably in the range of from 20 MPa to 30 MPa. A preferred combination of temperature and pressure is in the ranges of 150° C. to 400° C. and 16 MPa to 32 MPa respectively. A more preferred combination of temperature and pressure is in the ranges of 180° C. to 350° C. and 20 MPa to 27 MPa respectively. At a given temperature, it is most preferred to use a pressure high enough to maintain the reaction mixture at the reaction temperature, with or without a solvent, in a fluid state—typically a liquid state or a supercritical fluid state. While a completely fluid state, either liquid or supercritical, is preferred, it is within the scope of the present invention that a substantially fluid state may be used. Compounds like water, $CO_2$ or ethylene can be maintained as a supercritical fluid. The residence time is generally in the range of from 0.01 second to 20 minutes, preferably in the range of from 0.1 second to 4 minutes, more preferably in the range of from 0.5 second to 2 minutes, most preferably in the range of 1 second to 1 minute. "Residence time" is defined herein as the time the mixture comprising the monomers spends under the first condition for oligomerization.

A solvent or solvent mixture is not required, but may be used optionally as a medium, for the oligomerization reaction. They are herein collectively and interchangeably referred to as "solvent," "solvents" or "solvent mixture." A solvent selected for a particular oligomerization reaction should neither interfere with the desired oligomerization reaction nor react substantially with the functional group present either in any of the monomers or in the oligomer product. It is preferable that a solvent can be easily separated or removed from the reaction products by such methods as distillation, phase separation, or evaporation. If a catalyst, mediator, or initiator is used, it is preferred to have a solvent in which the catalyst or initiator is soluble in a usable amount. A mediator is a compound which, while not being able to catalyze the reaction, may nonetheless influence the reaction in a certain desirable manner. Examples of a solvent suitable for use in an oligomerization reaction include, but are not necessarily limited to, ethylene, pentane, hexane, heptane, octane, benzene, toluene, xylene(s), carbon dioxide, water, methanol, ethanol, isopropanol, acetone, methyl ethyl ketone, methyl isobutyl ketone, methyl formate, ethyl acetate, and mixtures thereof. Examples of initiators, if present, include hydrogen peroxide, alkylhydroperoxide such as t-butyl hydroperoxide and t-amyl hydroperoxide, dialkyl peroxides such as di-t-butyl peroxide, peracids, peresters, percarbonates, persulfates, ketone peroxides such as methyl ethyl ketone peroxide, oxygen, azo initiators and mixtures thereof.

In cases where the functional groups are generated by at least one post-oligomerization reaction, such a post-oligomerization reaction is carried out under a functional-group-generation condition which is known to those skilled in the art. Such post-oligomerization reactions include, but are not necessarily limited to hydrolysis, esterification, trans-esterification and epoxide ring-opening reaction. The reaction may be carried out in a solvent and/or in the presence of a catalyst. For example, in a hydrolysis, esterification, or trans-esterification reaction, an acid catalyst or a base catalyst is typically used.

The reaction between the functional group of the oligomer and the reactive moiety of a modifier is carried out under a second condition which depends on the functional group, the reactive moiety, the solvent (if present), and other physical and chemical properties of the oligomer and the modifier. The second condition comprises a temperature in the range of from 0° C. to 450° C. and a residence time in the range of from 0.1 second to 120 hours. Pressure is generally not a critical parameter unless the modifier has a relatively high vapor pressure at the reaction temperature. Accordingly, a wide range of pressure may be used. Ambient temperature is most convenient for most such reactions. If needed, a pressure in the range of from 1 kPa (about 0.01 bar) to 35 MPa (350 bars) maybe used. To the extent that such reactions conditions are disclosed in U.S. Pat. No. 4,059,616, U.S. Pat. No. 4,133,793, and U.S. Pat. No. 4,208,313, they are incorporated herein by reference.

This reaction between a functional group and a reactive moiety may be conveniently carried out in air if there are no substantial side reactions or by-product productions. Sometimes air or oxygen need be present in order to allow certain inhibitors such as hydroquinone to be used effectively. Optionally, a different non-reactive atmosphere may be used, particularly if air may interfere with reaction and/or cause any of the components to decompose or deteriorate. Examples of gases for providing such non-reacting atmosphere include, but are not necessarily limited to nitrogen, argon, helium or mixtures thereof. Gases like carbon dioxide also may be used alone or in conjunction with the non-reacting atmosphere described above if such gases do not interfere with the reaction and/or cause any of the components to decompose or deteriorate.

Unlike prior art products, the oligomers prepared in accordance with the process of the present invention are usually terminally unsaturated. If desired, the unsaturated terminals may be subjected to further reactions such as hydrogenation, epoxidation, or a number of other addition reactions known in the art.

A modifier suitable for the present invention depends on the nature of the functional group. They are described below in more detail. Generally, the modifier must have at least one reactive moiety which will react with the functional group. Another requirement of a suitable modifier is that it must have a crosslinkable group selected from the group consisting of carbon-carbon double bond (C=C), an oxygen-containing heterocyclic group, and mixtures thereof, wherein the crosslinkable group remains pendant or substantially unreacted after the reaction between the modifier and the oligomer through the reactive moiety and the functional group respectively.

Examples of a reactive moiety in a suitable modifier include, but are not necessarily limited to C—OH [hydroxyalkyl group], —C(=O)OH, —C(=O)OR, —C(=O)X, oxygen-containing heterocyclic group and mixtures thereof. R is selected from a $C_1$ to $C_{15}$ alkyl group or an aryl group. Examples include, but are not necessarily limited to methyl, ethyl, n-propyl, n-butyl, 2-ethylhexyl, phenyl, and mixtures thereof. X is selected from the group consisting of chloride, bromide, and iodide. Examples of an oxygen-containing heterocyclic group include oxiranyl, oxetanyl and 1,3-dioxolanyl groups of the following formula:

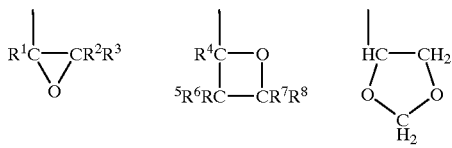

$R^1$, $R^2$, $R^3$, $R^4$, $R^5$, $R^6$, $R^7$, and $R^8$ are independently selected from the group consisting of H and $C_1$–$C_8$ alkyl groups. H is preferred for all of the "R" groups. It is also preferred to have two of $R^1$, $R^2$ and $R^3$ as H, and the other, $CH_3$.

Examples of a modifier include, but are not necessarily limited to, glycidyl acrylate, glycidyl methacrylate, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, cinnamic acid, methylcinnamic acid, acrylic acid, methacrylic acid, crotonic acid, methyl acrylate, methyl methacrylate, methyl crotonate, ethyl acrylate, ethyl methacrylate, ethyl crotonate, n-propyl acrylate, n-propyl methacrylate, n-propyl crotonate, n-butyl acrylate, n-butyl methacrylate, n-butyl crotonate, 2-ethylhexyl acrylate, 2-ethylhexyl methacrylate, 2-ethylhexyl crotonate, acryloyl chloride, methacryloyl chloride, crotonyl chloride, and mixtures thereof, provided that the respective modifies are chemically compatible with each other in the mixtures.

The following reactions between the oligomer and the modifier are within the scope of the present invention whether the functional groups are present in the monomer A prior to the oligomerization or they are generated post-oligomerization from either the "monomer A equivalent" or the monomer B units incorporated in the oligomer backbone structure.

I. When the functional group is hydroxy (—OH) groups, the reactive moieties of the modifier are selected from the group consisting of ethylenically unsaturated carboxylic acids, esters of the ethylenically unsaturated carboxylic acids, acyl halide derivatives of the ethylenically unsaturated carboxylic acids, and mixtures thereof. Examples of a monomer A in this group include, but are not necessarily limited to allyl alcohol, 2-hydroxyethyl acrylate, 2-hydroxyethyl methacrylate, 2-hydroxyethyl crotonate, 3-hydroxypropyl acrylate, 3-hydroxypropyl methacrylate, 3-hydroxypropyl crotonate, 4-hydroxybutyl acrylate, 4-hydroxybutyl methacrylate, 4-hydroxybutyl crotonate and mixtures thereof. Examples of monomer A equivalent include allyl acetate, allyl propionate, and vinyl acetate. Examples of a modifier include, but are not necessarily limited to, acrylic acid, methacrylic acid, crotonic acid, maleic acid, fumaric acid, itaconic acid, citraconic acid, cinnamic acid, methylcinnamic acid, methyl acrylate, methyl methacrylate, methyl crotonate, ethyl acrylate, ethyl methacrylate, ethyl crotonate, n-propyl acrylate, n-propyl methacrylate, n-propyl crotonate, i-propyl acrylate, i-propyl methacrylate, i-propyl crotonate, n-butyl acrylate, n-butyl methacrylate, n-butyl crotonate, 2-ethylhexyl acrylate, 2-ethylhexyl methacrylate, 2-ethylhexyl crotonate and mixtures thereof, acryloyl chloride, methacryloyl chloride, crotonyl chloride, methacrylic anhydride and mixtures thereof.

II. When the functional group is selected from the group consisting of epoxide (oxiranyl) and carbon-carbon double bond; and the modifiers consist essentially of a compound selected from an ethylenically unsaturated carboxylic acid or their mixtures, and an ethylenically unsaturated alcohol or their mixtures. Examples of a monomer A in this group are 1,3-butadiene 1,2 epoxide, glycidyl acrylate, glycidyl methacrylate, glycidyl crotonate, 1-vinyl-4-cyclohexene epoxide, 1,3-butadiene, isoprene, 1-vinyl-4-cyclohexene, norbornadiene, and mixtures thereof. Examples of a modifier include acrylic acid, methacrylic acid, crotonic acid, maleic acid, fumaric acid, itaconic acid, citraconic acid, cinnamic acid, methylcinnamic acid and mixtures thereof Other suitable modifiers include 2-hydroxyethyl acrylate, 2-hydroxyethyl methacrylate, 2-hydroxyethyl crotonate, 3-hydroxypropyl acrylate, 3-hydroxypropyl methacrylate, 3-hydroxypropyl crotonate, 4-hydroxybutyl acrylate, 4-hydroxybutyl methacrylate, 4-hydroxybutyl crotonate and mixtures thereof Methylolacrylamide also may be used as a modifier.

III. V When the functional group is selected from the group consisting of anhydride, alkoxysilyl, and mixtures thereof, the modifier is selected from the group consisting of hydroxyalkyl esters of ethylenically unsaturated carboxylic acids and mixtures thereof. Examples of the monomer A in this group include, but are not necessarily limited to maleic anhydride, itaconic anhydride, citraconic anhydride, γ-methacryloxypropyltrimethoxysilane, vinyltriethoxysilane, vinyltrimethoxysilane, vinyltrichlorosilane, allyltriethoxysilane, allyltrichlorosilane, vinyl crotonate and mixtures thereof. Examples of modifiers include, but are not necessarily limited to 2-hydroxyethyl acrylate, 2-hydroxyethyl methacrylate, 2-hydroxyethyl crotonate, 3-hydroxypropyl acrylate, 3-hydroxypropyl methacrylate, 3-hydroxypropyl crotonate, 4-hydroxybutyl acrylate, 4-hydroxybutyl methacrylate, 4-hydroxybutyl crotonate, and mixtures thereof.

IV. When the functional group is selected from the group consisting of hydroxyl (COH), carboxyl (COOH), amino ($NH_2$), and substituted amino (NHR or NR'R") groups, the reactive moiety of a modifier consists essentially of an oxiranyl group. Examples of a preferred monomer A is selected from the group consisting of dimethylaminoethyl methacrylate, dimethylaminoethyl acrylate, and mixtures thereof. Examples of such a modifier include glycidyl acrylate, glycidyl methacrylate and glycidyl crotonate.

V. When the functional group is selected from the group consisting of an anhydride group, the reactive moiety of a suitable modifier may be an oxiranyl group. Examples of a monomer A include maleic anhydride, citraconic anhydride, itaconic anhydride, and mixtures thereof. Examples of a suitable modifier include glycidyl acrylate, glycidyl methacrylate, glycidyl crotonate, and mixtures thereof.

VI. When the functional group is selected from the group consisting of an aldehyde, a ketone group, the reactive moiety in a suitable modifier is preferred to contain a hydroxyalkyl group. Examples of the monomer A include acrolein, methacrolein, methyl vinyl ketone, and mixtures thereof. Examples of a suitable modifier include 2-hydroxyethyl acrylate, 2-hydroxyethyl methacrylate, 2-hydroxyethyl crotonate, 3-hydroxypropyl acrylate, 3-hydroxypropyl methacrylate, 3-hydroxypropyl crotonate, 4-hydroxybutyl acrylate, 4-hydroxybutyl methacrylate, 4-hydroxybutyl crotonate and mixtures thereof.

VII. When the functional group is a vinyl group as part of an ester, no reaction with a reactive moiety is needed when the curing method is selected from electromagnetic irradiations. Examples of monomer A include, but are not necessarily limited to vinyl acrylate, vinyl methacrylate, vinyl crotonate, and mixtures thereof. Examples of monomer B include, but are not necessarily limited to, ethylene, propylene, $C_4$ to $C_{10}$ α-olefins, butadiene, isoprene, styrene, substituted styrene such as p-methylstyrene, vinyl ester, vinyl ether, vinyl silane such as vinyltrimethylsilane, vinyl halide, acrylic acid, methacrylic acid, crotonic acid, alkyl acrylate or methacrylate, or crotonate ester such as methyl acrylate, methyl methacrylate, methyl crotonate, ethyl acrylate, ethyl methacrylate, ethyl crotonate, n-propyl acrylate, n-propyl methacrylate, n-propyl crotonate, n-butyl acrylate, n-butyl methacrylate, n-butyl crotonate, and mixtures thereof., acrylamide, methacrylamide, N-substituted acrylamide, N-substituted methacrylamide and mixtures.

VIII. When monomer A is selected from vinyl chloride, vinyl bromide, vinyl acetate, vinyl benzoate, vinylidene halide (such as chloride or fluoride) and mixtures thereof, the modifier comprises a metal salt of an unsaturated acid or a mixture of such salts. Examples of such unsaturated acids include acrylic acid, methacrylic acid, crotonic acid, maleic acid, fumaric acid, itaconic acid, citraconic acid, cinnamic acid, methylcinnamic acid and mixtures thereof. The metal (ion) is selected from the group consisting of metals selected from the Groups IA(Li, Na, K, Rb, Cs), IIA (Be, Mg, Ca, Sr, Ba), IIIA(Al. Ga, In, Tl) and mixtures of the period table. (see inside front cover of CRC Handbook of *Chemistry and Physics*, 76th Ed. 1995–1996, D. R. Lide, Editor-in-Chief CRC Press, Inc. 1995) Examples of such a salt include, but are not necessarily limited to lithium acrylate, lithium methacrylate, lithium crotonate, sodium acrylate, sodium methacrylate, sodium crotonate, potassium acrylate, potassium methacrylate, potassium crotonate, rubidium acrylate, rubidium methacrylate, rubidium crotonate, cesium acrylate, cesium methacrylate, cesium crotonate, magnesium acrylate, magnesium methacrylate, magnesium crotonate, aluminum acrylate, aluminum methacrylate and mixtures thereof. It is preferred to use phase transfer catalysis (PTC) in this case to achieve reasonable reaction rates. PTC can be effected by choosing an appropriate phase transfer catalyst(s). Depending on the catalyst selected, the amount of a phase transfer catalyst used is, based on the total moles of the modifier present, in the range of from 0 mol % to 50 mol %, preferably in the range of from 0.001 mol % to 25 mol %, most preferably in the range of from 0.01 mol % to 20 mol %.

Typical phase transfer catalysts include, but are not limited to, quaternary ammonium, phosphonium, arsonium, antimonium, bismuthonium, and tertiary sulfonium salts, crown ethers. For the salts, examples of suitable counter ions include, but are not necessarily limited to, hydroxide, halide, sulfate, bisulfate, phosphate, nitrate, and mixtures thereof Examples of such catalysts include tetra-n-butylammonium bromide, tetra-n-butylammonium chloride, tetra-n-butylammonium iodide, tetra-n-butylammonium bisulfate, tetra-n-butylammonium hydroxide, tetraethylammonium bromide, tetramethylammonium bromide, tetra-n-propylammonium bromide, monomethyl, trioctylammonium chloride [Aliquat 336] benzyl triethylammonium bromide, hexyl triethylammonium bromide, octyl triethylammonium bromide, cetyl trimethylammonium bromide, tricaprylylmethylammonium bromide, phenyl trimethylammonium bromide, tetraphenylphosphonium bromide, triphenylmethylphosphonium bromide, tetrabutylphosphonium bromide, tetraphenylarsonium bromide, pyridyl-butyl bromide, cetylpyridinium bromide, dicyclohexano-18-crown-6 ether; 18-crown-6 and mixtures thereof A reference in the area is *Phase Transfer Catalysis Fundamentals, Applications, and Industrial Perspectives*, by C. Starks, C. Liotta, and M. Halpern, Chapman & Hall, New York, (1994). "Aliquat" is a registered trademark of General Mill, Inc.

IX: When the functional group in monomer A is an epoxide (oxiranyl) group, examples of a monomer A include glycidyl acrylate, glycidyl methacrylate, glycidyl crotonate, monoglycidyl maleate, monoglycidyl fumarate, and mixtures thereof. Examples of monomer B include, but are not necessarily limited to, ethylene, butadiene, isoprene, styrene, p-methylstyrene, methyl acrylate, methyl methacrylate, methyl crotonate, ethyl acrylate, ethyl methacrylate, ethyl crotonate, n-propyl acrylate, n-propyl methacrylate, n-propyl crotonate, n-butyl acrylate, n-butyl methacrylate, n-butyl crotonate, 2-ethylhexyl acrylate, 2-ethylhexyl methacrylate, 2-ethylhexyl crotonate, a vinyl ester such as vinyl acetate, a vinyl ether such as vinyl ethyl ether, vinyl n-propyl ether, vinyl n-butyl ether, vinyl silane such as vinyltrimethylsilane and mixtures thereof. The curing method is selected from the group consisting of acid cure, base cure, generation of acid by an electromagnetic irradiation selected from the group consisting of ultraviolet, visible light, X-ray irradiation, and y irradiation and combinations thereof to produce a cured product from the radiation curable composition.

Preferred oligomer compositions (monomer A and monomer B) and the corresponding modifiers include, but are not necessarily limited to, those listed in the following Table 1:

TABLE 1

| Group | monomer A (monomer A equivalent)[a] | monomer B[b] | modifier[c] |
|---|---|---|---|
| II | GA | BA | AA, MAA, or AOPA |
| II | GMA | BA | AA, MAA, or AOPA |
| II | GMA | EA | AA, MAA, or AOPA |
| I | HEA | BA | AA, MAA, or AOPA |
| III | MAN | BE | HEA or HEMA |
| IV | HEA | EA | ICEMA |
| II | IP | BA | AA |
| II | BD | BA | AA |
| IV | AA | BA | GMA |
| III | VTMO | BA | HEA or HEMA |
| I[d] | VOH (VAc) | BA | AA or AOPA |
| IV | HBA | BA | GMA or GA |

TABLE 1-continued

| Group | monomer A (monomer A equivalent)[a] | monomer B[b] | modifier[c] |
|---|---|---|---|
| IV | HBA | MMA | GMA or GA |
| I | HEA | BA | MA or MMA |
| I | HBA | BA | AA, MAA, or AOPA |

[a]monomer equivalents are in parentheses; AA: acrylic acid; GA: glycidyl acrylate; GMA: glycidyl methacrylate; BD: butadiene; IP: isoprene; MAA: methacrylic acid; HBA: 4-hydroxybutyl acrylate; HEA: 2-hydroxyethyl acrylate; MMA: methyl methacrylate; MA methyl acrylate; VOH: vinyl alcohol; VAc: vinyl acetate; VTMO: vinyltrimethoxy silane; MAN: maleic anhydride.
[b]BA: n-butyl acrylate; BVE: n-butyl vinyl ether; MMA: methyl methacrylate
[c]AA: acrylic acid; GA: glycidyl acrylate; GMA: glycidyl methacrylate; HEA: 2-hydroxyethyl acrylate; AOPA: acrylopropionic acid; ICEMA: isocyanatoethyl methacrylate.
[d]After the acetate group is hydrolyzed.

It is also within the scope of the present invention that the oligomers, after reaction with the modifier, may be dispersed or emulsified in a solvent consisting essentially of water to form a waterborne formulation which can be used and cured, provided that there is a reasonable chemical and physical stability of the composition in such a waterborne formulation. It is generally required to have a surfactant in the formulation. Many surfactants known to those skilled in the art may be used, including but not limited to anionic surfactants, cationic surfactants, amphoteric surfactants and nonionic surfactants. Some specific examples include Triton X-100 and Triton X-200. ("Triton" is a registered trademark owned by Union Carbide Chemicals & Plastics Technology Corporation.)

The terms "curable" and "crosslinkable" are used interchangeably herein to mean that a pendant double bond or oxygen-containing heterocyclic group can be further reacted/crosslinked under a set of suitable conditions and in the presence of one parameter selected from the group consisting of a catalyst, an energy source, a free radical source, an acid, a base, or a combination thereof. The curable composition may be cured (crosslinked) by a number of methods. Examples of such methods include, but are not necessarily limited to electromagnetic irradiation such as UV irradiation(UV), visible light irradiation(VIS), γ irradiation, and X-ray irradiation(X-ray), electron beam irradiation (E-beam), chemical or thermal generation of free radicals, electrochemical generation of free radicals, photochemical generation of free radicals and combinations thereof. For E-beam and/or electromagnetic irradiations such as UV/VIS irradiation as the curing method(s), the curable composition may further comprise one or more photoinitiators as an additive(s) which function as free-radical initiator(s), cationic initiator(s), or anionic initiator (s). A general reference for photo free-radical generations and photoinitiators can be found in Chapter 5 of "*Photogeneration Of Reactive Species For UV Curing*" by C. Roffey, John Wiley & Sons, New York, N.Y. (1997). To the extent the reference discloses various suitable photoinitiators and/or photo free-radical generations, it is incorporated herein by reference.

Acids or electromagnetic irradiation (such as UV and/or VIS irradiation) for generating acids or bases may be used for curing a composition having oxygen-containing heterocyclic groups such as oxiranyl, oxetanyl or 1,3-dioxolanyl groups. E-beam, UV and/or VIS irradiation(s) are three of the preferred curing methods.

The curable compositions, particularly may further comprise one or more diluent monomers as another additive, with or without one or more photoinitiators. Such a diluent monomer(s) may or may not be the same as one or more of the monomers which are already incorporated into the backbone of the oligomer(s). Many monomers or their mixtures used to form the oligomer(s) may serve the function as a "diluent monomer(s)." A diluent monomer may serve to reduce viscosity, provide solvency, and/or provide additional desired properties to the final cured product, particularly for producing an electromagnetic irradiation cured product. A general reference of such diluent monomers or sometimes referred to as reactive monomers in the curing composition can be found in Chapter 6 of "*Photogeneration Of Reactive Species For UV Curing*" by C. Roffey, John Wiley & Sons, New York, N.Y. (1997).

Table 2 provides a simplified general guideline for selecting the various components:

TABLE 2

| Curing method | Required[a] | Optional[b] |
|---|---|---|
| EB, X-ray or γ-ray | — | monomers |
| UV or VIS | photo initiators (radical; photoacid; photobase) | monomers |
| free radical (thermal or chemical) | free radical sources | monomers |
| acid or base | acid or base sources | monomers |

[a]Oligomers are required for all the methods.
[b]See text for the definition of "monomers" (diluent monomers)

Generally, a UV source has a wavelength in the range of from 180 nm to 400 nm. A visible light (VIS) source has a wavelength in the range of from 400 nm to 700 nm. Information regarding EB may be found in *Radiation Curing In Polymer Science and Technology—Volume I*, ed. J. P. Fouassier and J. F. Rabek, Elsevier Applied Science, New York, 1993 Information regarding photoacids may be found in *Radiation Curing In Polymer Science and Technology—Volume II*, ed. J. P. Fouassier and J. F. Rabek, Elsevier Applied Science, New York, 1993 and in *Prog. Polym. Sci.*, Vol. 21, pp 1–45, 1996.

For all the reactions involved in the process discussed herein, it is understood that they can be carried out individually in a continuous mode, a semi-continuous mode, a batch mode, a continuously stirred tank reactor mode, or a combination thereof. The various stages of the process may be carried out in the same reactor or different reactors. It is preferred to carry out the oligomerization reaction in a continuous mode. The reactor geometry and/or the residence time may be adjusted to provide different flow regimes for controlling the product yield, product composition and/or product properties. Such information is available in many references. One such reference is U.S. Pat. No. 5,710,227 (supra). Alternately, some of the reactions may be carried out simultaneously in a continuous mode, a semi-continuous mode, a batch mode, a continuously stirred tank reactor mode, or a combination thereof.

While it is generally preferred to recover the product from each individual reaction of the process prior to conducting the next reaction, the present invention also will work with minimum or no recovery or no purification. For example, it is not required to recover/separate the oligomers prior to reacting with a modifier to produce the curable compositions, or carrying out the post-oligomerization generation of functional groups. In a case where the monomers and the modifier in the feed at the same time, there is no need for any intermediate purification or separation. Typical recovery or purification methods include, but not necessarily limited to distillation, extraction, filtration, centrifugation, sedimentation, solvent removal, residual monomer removal, residual modifier removal, catalyst removal and combinations thereof.

The present invention further relates to a curable composition prepared in accordance with the disclosed process. In particular the curable composition comprises of an oligomer having a Dp in the range of from 3 to 100 which has reacted with a modifier after the oligomer is formed, wherein the oligomer is prepared from a monomer A and monomer B. The composition may further comprise a free monomer selected from any of the monomers disclosed herein. The free monomer may or may not be the same as either the monomer A or the monomer B in the oligomer.

Preferably, the curable composition consists essentially of (a) an oligomer having a Dp in the range of from 3 to 100 which has reacted with a modifier after the oligomer is formed, wherein the oligomer is prepared from a monomer A and monomer B, (b) a free monomer selected from any of the monomers disclosed herein, (c) an initiator, . The free monomer may or may not be the same as either the monomer A or the monomer B in the oligomer.

The following examples are intended for illustration purposes only. They should not be interpreted to limit the scope or spirit of the present invention which is solely defined by the claims and the specification disclosed herein.

EXAMPLE I

Oligomerization

An oligomer of the present invention may be prepared in accordance with the following procedure.

A 10-foot (3.3 meters) long section of stainless tubing having an inner diameter of one-sixteenth inch (1.6 mm) and wall thickness of 0.050 inch (1.27 mm) was connected at one end to a high pressure pump (Hewlett Packard Model HP 1050 TI) and at the other end to a back-pressure control device. Between the two ends, the section of tubing was coiled about a torus-shaped metal mandrel. The mandrel was situated above a primary coil of a transformer so that the coils of tubing and the mandrel functioned as secondary coils of the transformer. The coils of tubing were further equipped with one end of a temperature probe. The other end of the temperature probe was connected to a temperature controlling device. The temperature controlling device regulated the current supplied to the primary coil of the transformer which had the effect of regulating the heat of inductance imparted to the coiled steel tubing.

A mixture of a monomer A and a monomer B (a few specific examples are shown below in the Table 3) was used in the oligomer synthesis reaction. The mixture may further comprise an initiator and optionally a solvent. Nitrogen was bubbled through the mixture while stirring. If a solvent was not used, the initiator and monomers were separately fed into the reactor.

In a typical experiment, a suitable solvent was pumped into and through the tubing via the high pressure pump at a certain preset rate in the range of from about 0.05 to about 10 milliliters per minute (ml/min). The pressure was maintained at a level of from 20 MPa (200 bars) to 35 MPa (350 bars). Electric current was supplied to the primary coil of the transformer to increase the temperature within the tubing to the desired oligomerization temperature. The current was then adjusted to maintain that temperature for the oligomerization reaction. After about 15 minutes, the solvent being pumped through the tubing was replaced by the reaction mixture which as continuously pumped through the tubing at the same preset rate while maintaining the desired temperature and pressure. After an amount of time has elapsed for the solvent to be totally replaced from the inside of the tubing, the effluent from the back-pressure control device was collected as the product. After the supplies of the mixture, or individual monomers, were used up, a solvent was pumped through the tubing at the same present rate, temperature, and pressure. Any solvent and/or residual monomers were removed from the product on a rotary evaporator.

The products in Table 3 were analyzed by various analytical methods—molecular weights by gel permeation chromatography (GPC); structure and co-monomer ratio by proton and carbon NMR spectroscopies; and end-groups by NMR or matrix-assisted laser desorption mass spectrometry (MALDI-MS).

TABLE 3

| Oligomer# | Monomer A* | Monomer B* | Mw | Mn |
| --- | --- | --- | --- | --- |
| A | 2.6 HBA | 5.6 BA | 2130 | 1091 |
| B | 3.2 HEA | 5.4 BA | 2302 | 1064 |
| C | 2.5 GA | 6.0 BA | 2245 | 1083 |
| D | 2.5 GMA | 5.4 BA | 2250 | 1144 |
| E | 2.5 HEA | 6.0 BA | 5350 | 2384 |

: Dp's are: A: 8.2; B: 8.6; C: 8.5; D: 7.9; E: 8.5
*: Average number of monomer units per oligomer. HBA: 4-hydroxy butyl acrylate; HEA: hydroxyethyl acrylate; GA: glycidyl acrylate; GMA: glycidyl methacrylate; BA: n-butyl acrylate.

EXAMPLE II

Reaction of a Modifier with an Oligomer

The equipment used was a 250 ml three-neck round bottom flask outfitted with a reflux condenser, an overhead stirrer, a gas inlet tube and a thermocouple. The flask was charged with (a) 137.06 grams of an oligomer having a composition of 38:62 (mole %) of GMA (glycidyl methacrylate, monomer A) to EA (ethyl acrylate, monomer B), a Dp of 6.5 and 23,000 ppm residual GMA, (b) 40.0 grams acrylic acid, (c) 0.2 grams of Cordova Accelerator AMC-2 (chromium 2-ethylhexanoate), and (d) 0.26 grams of a 10%(weight) solution of Actrene [registered trademark of Exxon Corporation] in propylene glycol methyl ethyl ether.

The mixture in the flask was stirred and heated under dry nitrogen to 90° C. for 6 hours. No GMA residuals were detected after this period. The reflux condenser was then replaced with a distillation head and any unreacted AA was removed by distillation under reduced pressure with a house vacuum.

Other examples where the modifier was acrylic acid (AA) were:

TABLE 4

| Product | Monomer A* | Monomer B* | Modifier | Mw | Mn |
| --- | --- | --- | --- | --- | --- |
| A2 | 2.6 HBA | 5.6 BA | 2.5 AA | 3567 | 1350 |
| B2 | 3.2 HEA | 5.4 BA | 3.1 AA | 5124 | 1740 |
| C2 | 2.5 GA | 6.0 BA | 2.5 AA | 2719 | 1385 |
| D2 | 2.5 GMA | 5.4 BA | 2.5 AA | 2614 | 1279 |

*: Average number of monomer units per oligomer. HBA: 4-hydroxy acrylate; HEA: hydroxyethyl acrylate; GA: glycidyl acrylate; GMA: glycidyl methacrylate; BA: n-butyl acrylate.
: Dp: A2, 8.2; B2, 8.6; C2: 8.5; D2: 7.9.

EXAMPLE III

Reaction of a Modifier with an Oligomer

The equipment used was a 100 ml three-neck round bottom flask outfitted with a reflux condenser, an magnetic stirring bar, an air inlet tube and a thermocouple. The flask was charged with 41.1 grams of an oligomer having a composition of 20:80 (mole %) of AA (acrylic acid, monomer A) to BA (n-butyl acrylate, monomer B) and Mn of 1204. With stirring, the flask and the oligomer were heated to about 100° C. under a dry air purge over a period of 15 minutes. The mixture was cooled to room temperature over a 30 minute period under a dry air purge, followed by addition of 16.31 grams of GMA, 20 grams ethyl acetate and 0.06 grams of Cordova Accelerator AMC-2 (chromium 2-ethylhexanoate). While stirring under a dry air purge, the mixture was heated to about 85° C. for five hours. It was then cooled to room temperature. Residual GMA was found to be 2300 ppm.

A portion of 0.25 g of 2-(ethylamino)ethanol was added to the flask and the mixture was heated to 65° C. over 20 minutes, cooled to room temperature and let stand for 4 days. Residual GMA was found to be 150 ppm. To this were added 20.0 grams acetic acid and 10.0 grams of ethyl acetate. The mixture was heated to 80° C. for 8 hours. No residual GMA was detected after this period. The reflux condenser was then replaced with a distillation head. Residual acetic acid and ethyl acetate were distilled off under reduced pressure to produce the desired product.

temperature (Tg) and viscosity of the liquid product were −73° C. and 16,000 MPa-sec (cps, Brookfield viscometer at 25° C.) respectively.

EXAMPLE V

Reaction of Modifier with Oligomer

The following are other examples. Reactions 1–4 were carried out neat, and reactions 5–10, in refluxing toluene with azeotropic removal of water. The reaction mixture also contained inhibitors: 1. 4-hydroxy-2,2,6,6,-tetramethylpiperidinyloxy (HTEMPO, 500 ppm); 2: butylhydroxytoluene (BHT, 1000 ppm)/air; 3: HTEMPO (500 ppm); 4: HTEMPO (500 ppm); 5: BHT 1000 ppm)/air; 6: hydroquinone(1000 ppm)/air; 7: HTEMPO (500 ppm); 8: HTEMPO (500 ppm); 9: HTEMPO (500 ppm); 10: HTEMPO (500 ppm).

TABLE 5

| No. | oligomer[a] | modifier[b] | catalyst[c] | time (h) | temp (° C.) | conv[d] | conv[e] | Mw/Mn |
|---|---|---|---|---|---|---|---|---|
| 1 | P1 | AA | Cr | 1.5 | 100 | 97% | 96% | 4015/1517 |
| 2 | P1 | AA | Cr | 1.5 | 100 | 91% | 95% | 4075/1494 |
| 3 | P1 | AA | Cr | 1.5 | 100 | 100% | 97% | 2884/1466 |
| 4 | P1 | AA | Cr | 2.5 | 100 | 98% | 94% | 2719/1385 |
| 5 | P2 | AA | MSA[f] | 3.5 | g | 97% | h | 3600/1515 |
| 6 | P3 | AA | MSA[f] | 6.5 | g | 93–100% | h | 3728/1148 |
| 7 | P2 | AA | AM | 2.5 | g | 88 | h | 4217/1285 |
| 8 | P2 | AA | AM | 2.5 | g | 93 | h | 5644/1760 |
| 9 | P2 | AA | AM | 2.5 | g | 93 | h | 4734/1383 |
| 10 | P2 | AA | AM | 2.5 | g | 100 | h | 3294/1291 |

[a]P1: 6.0 n-butyl acrylate/2.5 glycidyl acrylate (mole ratio); $M_w/M_n$ = 2245/1083; Dp = 8.5 P2: 5.6 n-butyl acrylate/2.6 4-hydroxybutyl acrylate (mole ratio); $M_w/M_n$ = 2130/1091; Dp = 8.0 P3: 4.8 n-butyl acrylate/2.4 4-hydroxybutyl acrylate (mole ratio); $M_w/M_n$ = 1965/969; Dp = 7.2
[b]AA: acrylic acid; AOPA: acrylopropionic acid
[c]Cr: chromium 2-ethylhexanoate, 0.1 wt % based on total weight of reaction mixture, ~100 ppm Cr. MSA: methanesulfonic acid; for runs 5, 6, and 7, 2 mol % of MSA, based on HBA in the oligomer was used. AM: Amberlyst 15 [Amberlyst is a registered trademark of Rohm and Haas Company]
[d]Conversion of functional group on the oligomer.
[e]Conversion of reactive moiety on the modifier.
[f]40 mole % concentration.
[g]Refluxing toluene temperature.
[h]Not measured.

EXAMPLE IV

Reaction of Modifier with Oligomer

The equipment used was a 250 ml pear-shaped flask outfitted with a magnetic stirring bar and a drying tube. The flask was charged with (a) 25 grams of an oligomer having a composition of 1:2 (mole ratio) of HEA (monomer A) to EA (monomer B); (b) 50 ml THF; and (c) 12.2 grams of isocyanatoethyl methacrylate (ICEMA). A 0.05g dibutyltin dilaurate catalyst was added to this mixture at 25° C. The mixture was then stirred at 25° C. for two days. An additional 0.45 g of the same catalyst was added and the mixture was heated in an oil bath to 50° C. for 4 days. At this time, it was determined that all the isocyanate groups have been converted to urethane groups. The product was concentrated by removing volatiles with a rotary evaporator. The product was characterized by Fourier transform infrared spectroscopy (FTIR); C-13 nuclear magnetic resonance (NMR); 2-dimensional NMR, and MALDI-MS. The glass transition These examples showed that oligomers could be reacted with modifiers to form products of this invention.

EXAMPLE VI

UV Curing

An oligomer, either neat, or formulated, was applied to the surface of a substrate by using a wet film applicator to form a film with 2 mil ($5.1 \times 10^{-3}$ cm) thickness. The film applicator used was an Eight-Path Wet Film Applicator from Paul N. Gardner Company, Inc. Substrates include glass, aluminum, and cold rolled steel.

The coated surfaces were then cured, in air or nitrogen, with an RPC Model 1202 UV processor equipped with two 200 watts/inch (80 watts/cm) medium pressure mercury arc lamps at a belt speed of 20 to 100 feet (6 to 30 meters) per minute. The table below represents the typical energy/area at various belt speeds, measured by using a Compact Radiometer (UV Process Supply Inc.).

TABLE 6

| Speed (feet/min; [meters/min]) | Energy/Area (mJoule/cm$^2$) |
|---|---|
| 20 [6] | 2400 |
| 40 [12] | 1200 |
| 60 [18] | 780 |
| 80 [24] | 620 |
| 100 [30] | 500 |

The following Table 7 shows curing results obtained with neat product in the presence of 2 wt % Darocure 1173 obtained from Ciba Specialty Chemicals.

TABLE 7

| Product | Swell Ratio$^a$ | Soluble Fraction$^b$ (%) | Cure Conditions no of passes/speed/atmosphere |
|---|---|---|---|
| A2 | 3.3 | 35 | 3/50 ft/min/air |
| B2 | 2.1 | 15 | 4/50 ft/min/nitrogen |
| B2 | 2.0 | 13 | 1/20 ft/min/nitrogen |
| B2 | 1.7 | 5 | 2/20 ft/min/nitrogen |
| C2 | 1.6 | 9 | 6/50 ft/min/nitrogen |
| D2 | 1.8 | 9 | 6/50 ft/min/nitrogen |
| E2 | 1.1 | 0 | 3/50 ft/min/nitrogen |

$^a$determined by the ratio of the wet sample weight to the final dry sample weight in tetrahydrofuran (THF).
$^b${(initial sample weight—final dry sample weight)/initial sample weight} X 100% in THF.

The following Table 8 shows curing results with product B2 in the presence of different amounts of a monomer TMPTA (and 2 wt % Darocure 1173 obtained from Ciba specialty chemicals).

TABLE 8

| B2 wt % | TMPTA wt % | Swell Ratio | Soluble Fraction (%) | Cure Conditions* no of passes/speed |
|---|---|---|---|---|
| 100 | 0 | 2.0 | 13 | 1/20 ft/min |
| 75 | 25 | 1.2 | 3 | 1/20 ft/min |
| 50 | 50 | 1.1 | 0 | 1/20 ft/min |

*under nitrogen

These examples showed that curable compositions prepared in accordance with the present invention could be cured under a variety of conditions.

It is claimed:

1. A process of preparing a curable composition comprising the steps of:
   (a) forming an oligomer having a Dp in the range of from 3 to 100 by either:
      (i) oligomerizing a mixture comprising a monomer A and a monomer B, wherein the monomer A has at least one functional group which remains substantially unreacted during the oligomerization process; or
      (ii) oligomerizing a mixture comprising a monomer A equivalent and a monomer B and generating the at least one functional group during or after the oligomerization process;
      wherein the oligomer has a first number of monomer units incorporated into its backbone; and wherein the oligomerization process is conducted at a temperature in the range of from 150° C. to 650° C., a pressure in the range of from 3 MPa to 35 MPa which is sufficient to maintain the mixture in a fluid state and a residence time in the range of from 0.1 second to 1 minute;
   (b) reacting a modifier having at least one reactive moiety with the oligomer through a reaction under a second condition between the reactive moiety of the modifier and the functional group incorporated into the oligomer to produce the curable composition,
      wherein the modifier further comprises a curable group selected from the group consisting of a carbon-carbon double bond, an oxygen-containing heterocyclic group and mixtures thereof, and the curable group remains pendant in the curable composition and crosslinkable after the reaction.

2. A process of preparing a curable composition comprising the steps of:
   v(a) forming an oligomer having a Dp in the range of from 3 to 100 by either:
      (i) oligomerizing a mixture comprising a monomer A and a monomer B, wherein the monomer A has at least one functional group which remains substantially unreacted during the oligomerization process; or
      (ii) oligomerizing a mixture comprising a monomer A equivalent and a monomer B and generating the at least one functional group during or after the oligomerization process;
      wherein the oligomer has a first number of monomer units incorporated into its backbone; and wherein the oligomerization process is conducted at a temperature in the range of from 275° C. to 450° C., a pressure in the range of from 3 MPa to 35 MPa which is sufficient to maintain the mixture in a fluid state and a residence time in the range of from 0.1 second to 4 minutes;
   (b) reacting a modifier having at least one reactive moiety with the oligomer through a reaction under a second condition between the reactive moiety of the modifier and the functional group incorporated into the oligomer to produce the curable composition,
      wherein the modifier further comprises a curable group selected from the group consisting of a carbon-carbon double bond, an oxygen-containing heterocyclic group and mixtures thereof, and the curable group remains pendant in the curable composition and crosslinkable after the reaction.

3. The process of claim 1, wherein said monomer B is selected from the group consisting of ethylene, propylene, $C_4$ to $C_{10}$ α-olefins, butadiene, isoprene, styrene, substituted styrene, vinyl ester, vinyl ether, vinyl silane, vinyl halide, acrylic acid, methacrylic acid, crotonic acid, alkyl acrylate ester, alkyl methacrylate ester, alkyl crotonate ester, acrylamide, methacrylamide, N-substituted acrylamide, N-substituted methacrylamide and mixtures thereof.

4. The process of claim 1, wherein the at least one functional group is selected from the group consisting of a hydroxyl group, a carboxylic acid group, a halide, an oxiranyl group, an anhydride group, an ester, an alkoxysilyl group, and a carbon-carbon double bond.

5. The process of claim 1, wherein the monomer A is selected from the group consisting of allyl alcohol, allyl acetate, allyl propionate, allyl acrylate, allyl methacrylate, allyl crotonate, vinyl acrylate, vinyl methacrylate, vinyl crotonate 1,3-butadiene, isoprene, glycidyl methacrylate, glycidyl acrylate, 2-hydroxyehyl acrylate, 3-hydoxypropyl acrylate, 4-hydroxybutyl acrylate, 2-hydroxyethyl methacrylate, 3-hydroxypropyl methacrylate, 4-hydroxybutyl methacrylate, maleic anhydride, itaconic anhydride, citraconic anhydride, vinyltrimethoxysilane, γ-methacryloxypropyltrimethoxysilane, vinyltriethoxysilane, vinyltrichlorosilane, allyltriethoxysilane, allyltrichlorosilane, and mixtures thereof; and the monomer B is selected from the group consisting of acrylic acid, methacrylic acid, crotonic acid, maleic acid, fumaric acid, itaconic acid, citraconic acid, cinnamic acid, methylcinnamic acid, methyl acrylate, methyl methacrylate, ethyl acrylate, ethyl methacrylate, n-propyl acrylate, n-propyl methacrylate, i-propyl acrylate, i-propyl methacrylate, n-butyl acrylate, n-butyl methacrylate, sec-butyl acrylate, sec-butyl methacrylate and mixtures thereof.

6. The process of claim 1, wherein the modifier is selected from the group consisting of acrylic acid, methacrylic acid, crotonic acid, methyl acrylate, methyl methacrylate, methyl crotonate, ethyl acrylate, ethyl methacrylate, ethyl crotonate, n-propyl acrylate, n-propyl methacrylate, n-propyl crotonate, i-propyl acrylate, i-propyl methacrylate, i-propyl crotonate, n-butyl acrylate, n-butyl methacrylate, n-butyl crotonate, acryloyl chloride, methacryloyl chloride, crotonyl chloride, and mixtures thereof; and the monomer A is selected from the group consisting of allyl alcohol, allyl acetate, allyl propionate, 2-hydroxyethyl acrylate, 2-hydroxyethyl methacrylate, 2-hydroxyethyl crotonate, 3-hydroxypropyl acrylate, 3-hydroxypropyl methacrylate, 3-hydroxypropyl crotonate, 4-hydroxybutyl acrylate, 4-hydroxybutyl methacrylate, 4-hydroxybutyl crotonate, an oxiranyl, and mixtures thereof.

7. The process of claim 2, wherein said monomer B is selected from the group consisting of ethylene, propylene, $C_4$ to $C_{10}$ α-olefins, butadiene, isoprene, styrene, substituted styrene, vinyl ester, vinyl ether, vinyl silane, vinyl halide, acrylic acid, methacrylic acid, crotonic acid, alkyl acrylate ester, alkyl methacrylate ester, alkyl crotonate ester, acrylamide, methacrylamide, N-substituted acrylamide, N-substituted methacrylamide and mixtures thereof.

8. The process of claim 2, wherein the at least one functional group is selected from the group consisting of a hydroxyl group, a carboxylic acid group, a halide, an oxiranyl group, an anhydride group, an ester, an alkoxysilyl group, and a carbon-carbon double bond.

9. The process of claim 2, wherein the monomer A is selected from the group consisting of allyl alcohol, allyl acetate, allyl propionate, allyl acrylate, allyl methacrylate, allyl crotonate, vinyl acrylate, vinyl methacrylate, vinyl crotonate, 1,3-butadiene, isoprene, glycidyl methacrylate, glycidyl acrylate, 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, maleic anhydride, itaconic anhydride, citraconic anhydride, vinyltrimethoxysilane, γ-methacryloxypropyltrimethoxysilane, vinyltriethoxysilane, vinyltrichlorosilane, allyltriethoxysilane, allyltrichlorosilane, and mixtures thereof; and the monomer B is selected from the group consisting of acrylic acid, methacrylic acid, crotonic acid, maleic acid, fumaric acid, itaconic acid, citraconic acid, cinnamic acid, methylcinnamic acid, methyl acrylate, methyl methacrylate, ethyl acrylate, ethyl methacrylate, n-propyl acrylate, n-propyl methacrylate, i-propyl acrylate, i-propyl methacrylate, n-butyl acrylate, n-butyl methacrylate, sec-butyl acrylate, sec-butyl methacrylate and mixtures thereof.

10. The process of claim 2 wherein the modifier is selected from the group consisting of acrylic acid, methacrylic acid, crotonic acid, methyl acrylate, methyl methacrylate, methyl crotonate, ethyl acrylate, ethyl methacrylate, ethyl crotonate, n-propyl acrylate, n-propyl methacrylate, n-propyl crotonate, i-propyl acrylate, i-propyl methacrylate, i-propyl crotonate, n-butyl acrylate, n-butyl methacrylate, n-butyl crotonate, acryloyl chloride, methacryloyl chloride, crotonyl chloride, and mixtures thereof; and the monomer A is selected from the group consisting of allyl alcohol, allyl acetate, allyl propionate, 2-hydroxyethyl acrylate, 2-hydroxyethyl methacrylate, 2-hydroxyethyl crotonate, 3-hydroxypropyl acrylate, 3-hydroxypropyl methacrylate, 3-hydroxypropyl crotonate, 4-hydroxybutyl acrylate, 4-hydroxybutyl methacrylate, 4-hydroxybutyl crotonate, an oxiranyl, and mixtures thereof.

* * * * *